No. 615,203. Patented Nov. 29, 1898.
F. WOODCOCK.
PITCH CHAIN FOR CYCLES, &c.
(Application filed Apr. 30, 1898.)
(No Model.)
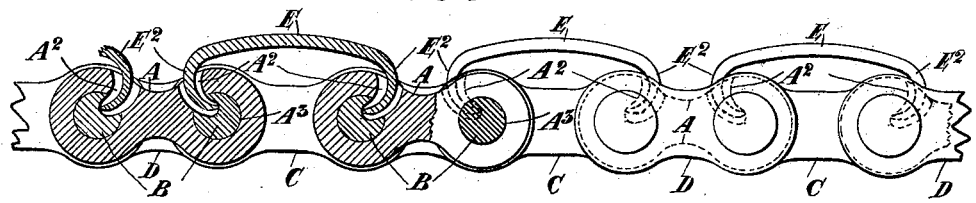
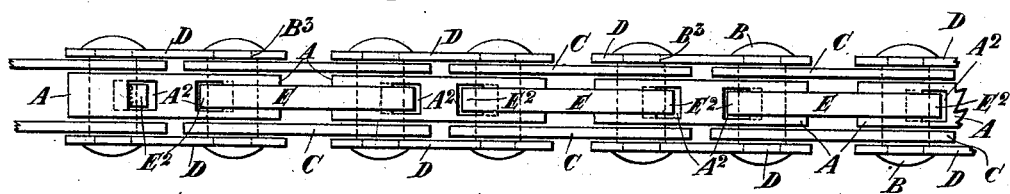
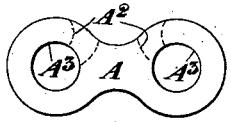
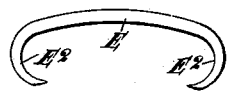
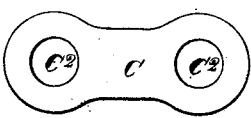
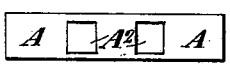
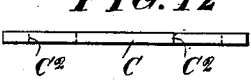
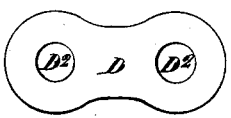
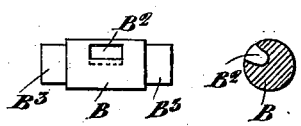
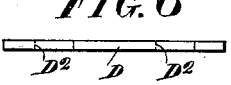
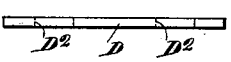
Witnesses:
E. B. Bolton
Inventor:
Frederick Woodcock
By
his Attorneys.
THE NORRIS PETERS CO., PHOTO-LITHO., WASHINGTON, D. C.

United States Patent Office.

FREDERICK WOODCOCK, OF BRADFORD, ENGLAND.

PITCH-CHAIN FOR CYCLES, &c.

SPECIFICATION forming part of Letters Patent No. 615,203, dated November 29, 1898.

Application filed April 30, 1898. Serial No. 679,343. (No model.)

*To all whom it may concern:*

Be it known that I, FREDERICK WOODCOCK, a subject of the Queen of England, residing at 5 Marshfield Place, West Bowling, Bradford, England, have invented certain new and useful Improvements in Pitch-Chains for Cycles or the Like, of which the following is a specification.

This invention relates to improvements in pitch-chains for transmitting power by sprocket-wheels—as, for instance, cycle-chains and the like; and its object is for various reasons to make the "backlash" of the chain springy instead of "dead," as heretofore. For this purpose a spring is provided for each pair of links, tending to draw such links or the pins by which they are pivoted together and take up the "play" between such links, so that when not working at a heavy load the various bearings of the pins and links of the chain are acting against the diametrically opposite side to that in which they bear when the working strain is put upon the chain.

In the accompanying drawings, Figure 1 represents a side elevation, partly in section, of a pitch-chain made in accordance with my invention. Fig. 2 is a plan view of same. Figs. 3 to 12 are views of details hereinafter referred to.

The block-links A have two holes or recesses $A^2$ formed in them, extending into the eyes $A^3$ for the pins or rivets B. Figs. 3 and 4 represent two separate views of one of the links A, and Figs. 9 and 10 a plan view and section of one of the pins. The pins B have recesses $B^2$ formed in them, extending approximately to the center, and when the chain is riveted up the recesses $B^2$ lie opposite the holes $A^2$. The links A are loosely coupled together in the ordinary way by the side links C, and to keep the pins B from turning and also to strengthen the chain the rivets are coupled together in pairs by the outer links D, the eyes $D^2$ of which are placed on the reduced parts $B^3$ of the pins, and the ends of the latter are then riveted over, as shown in Fig. 2, to rigidly hold the pins, as well as hold the parts of the chain together. Figs. 5 and 6 represent two separate views of one of the outer links D, and Figs. 11 and 12 represent similar views of one of the links C. C-shaped or other suitable springs E are now sprung into the position shown in Figs. 1 and 2, and the curved ends $E^2$ of such springs bear against the bottoms of the recesses $B^2$ in the pins and press the pairs of pins engaged by each spring toward each other. Figs. 7 and 8 are two separate views of one of the springs E. By this means more or less elasticity is given to the chain, according to the amount of play between the eyes $C^2$ and the pins B, and when the chain is running "light" such pins bear against opposite sides of the eyes $C^2$ to that against which they bear when transmitting power.

I claim—

1. In combination with a pitch-chain, a plurality of springs connecting the rivets in pairs and adapted to contract the chain to the limit allowed by the play of the rivets in the links of the chain, substantially as described.

2. In a pitch-chain, the combination with links made with recesses $A^2$ of springs E entering said recesses, substantially as herein shown and described.

3. In a pitch-chain the combination with links made with recesses $A^2$ and pins with recesses $B^2$, of springs E entering said recesses, substantially as herein shown and described.

4. In a pitch-chain the combination with links made with recesses $A^2$ and pins with recesses $B^2$ and side links D connecting such pins, of springs E entering said recesses substantially as herein shown and described.

In witness whereof I have hereunto set my hand in presence of two witnesses.

FREDERICK WOODCOCK.

Witnesses:
 DAVID NOWELL,
 SAMUEL A. DRACUP.